United States Patent [19]

Hawley

[11] Patent Number: 5,000,587
[45] Date of Patent: Mar. 19, 1991

[54] BEARING ASSEMBLY AND AUXILIARY BEARING SEAL

[75] Inventor: Erwin T. Hawley, Cape Coral, Fla.

[73] Assignee: Link-Belt Bearings Division of Rexnord Corporation, Indianapolis, Ind.

[21] Appl. No.: 487,132

[22] Filed: Mar. 2, 1990

[51] Int. Cl.⁵ .............................................. F16C 33/78
[52] U.S. Cl. ...................................... 384/478; 277/135
[58] Field of Search ............... 384/478, 135, 136, 906, 384/569; 277/133

[56] References Cited

U.S. PATENT DOCUMENTS

| | | | |
|---|---|---|---|
| 1,978,739 | 10/1934 | Brittain | 384/478 |
| 3,510,138 | 5/1970 | Bowen et al. | 384/478 |
| 4,269,459 | 5/1981 | Peck | 384/135 |
| 4,801,244 | 1/1989 | Stahl | 277/133 |

Primary Examiner—Lenard A. Footland
Attorney, Agent, or Firm—Woodard, Emhardt, Naughton Moriarty & McNett

[57] ABSTRACT

An auxiliary bearing seal comprises a formed flinger having portions closely conforming to adjacent surfaces of a bearing assembly for a rotating shaft, and is mountable to the shaft by means associated with the bearing assembly. The bearing assembly includes a housing in which the bearings are contained. The housing includes a cylindrical portion extending in a first direction and the inner race of the bearings extends in the first direction outwardly of the housing. A collar having an annular surface facing in the first direction and an outside diameter surface is received over the outwardly-extending portion of the inner race and is secured to the shaft with a set screw. The inventive seal includes a first annular portion received adjacent the annular surface of the collar, a first cylindrical portion received adjacent the outside diameter surface of the collar, a second cylindrical surface positioned adjacent but spaced from the cylindrical portion of the housing, and a second annular portion extending between the first and second cylindrical surfaces. The combination of the auxiliary seal with a bearing assembly is also disclosed.

9 Claims, 3 Drawing Sheets

BEARING ASSEMBLY AND AUXILIARY BEARING SEAL

BACKGROUND OF THE INVENTION

1. Field of the Invention

The present invention relates to the field of bearing assemblies and seals, and particularly to an auxiliary bearing seal comprising a close fitting flinger.

2. Description of the Prior Art

A variety of bearing seals and systems have been provided in the prior art. The purpose of such seals is well known to be the protection of the bearings from exterior dirt, etc. and the maintenance of lubrication etc. for the bearings. In certain applications, there are heightened problems due to extreme conditions such as high levels of dust, dirt and the like in the area of the bearings. In such instances, it is appropriate to provide additional sealing systems to protect the bearings from these extreme use conditions.

A particular type of bearing system includes bearings for reception of a rotating shaft, as shown for example in FIG. 1. The bearings 10 include inner races 11 within which the shaft 12 is received, and further include outer races 13 received within an annular housing 14. The housing includes an internal shoulder 15 against which is received one side of the outer bearing races. The housing further includes an internal thread spaced from the shoulder which receives an externally-threaded cover 16 that bears against and holds in place the other side of the outer races of the bearings. A collar 17 is received over an outwardly extending portion 18 of the inner race(s), and a set screw 19 extends through the collar and engages the shaft.

In the prior art, an annular seal 20 has typically been provided between the cover and the inner race. In certain instances, auxiliary seals have been provided to further protect the bearings. For example, one approach has been to provide a second annular seal 21, which covers the space between the collar 17 and the cover 16 (FIG. 1). A second approach is shown in FIG. 1A, in which a flinger 22 is shown received over the collar 17.

In some bearing environments it is particularly difficult to provide adequate sealing. The conditions of use can be extremely hard on the bearings and associated sealing systems. For example, stalk choppers, concrete saws and concrete planers generate great amounts of dirt and dust. Also, in many machines the space within which to place auxiliary seals is quite restricted. In these environments, it has been found that standard and auxiliary sealing systems have been found to be unsatisfactory. The result has been that lubrication of the bearings and maintenance of the seals has had to be undesirably frequent, or rapid bearing failures have occurred. For these applications, there has been a continuing need for a compact and highly efficient auxiliary bearing seal, which need is satisfied by the present invention.

SUMMARY OF THE INVENTION

Briefly describing one aspect of the present invention, there is provided an auxiliary bearing seal which comprises a compact, inexpensive flinger of particular design. The flinger is shaped to closely conform with associated components of the bearing system, and achieves superior sealing results. The flinger includes a first annular flange overlying the bearing collar, a first cylindrical portion overlying the outer diameter of the collar, a second annular flange overlying the bearing cover, and a second cylindrical portion adjacent to but spaced from the outer diameter of the bearing housing.

It is an object of the present invention to provide an auxiliary bearing seal which provides superior protection to shaft bearings, particularly in applications characterized by high levels of dirt, dust, etc.

Another object of the present invention is to provide an auxiliary seal which is relatively inexpensive, compact and easy to mount.

Further objects and advantages will be apparent from the description of the preferred embodiment which follows.

DESCRIPTION OF THE PREFERRED EMBODIMENT

Figure 1:
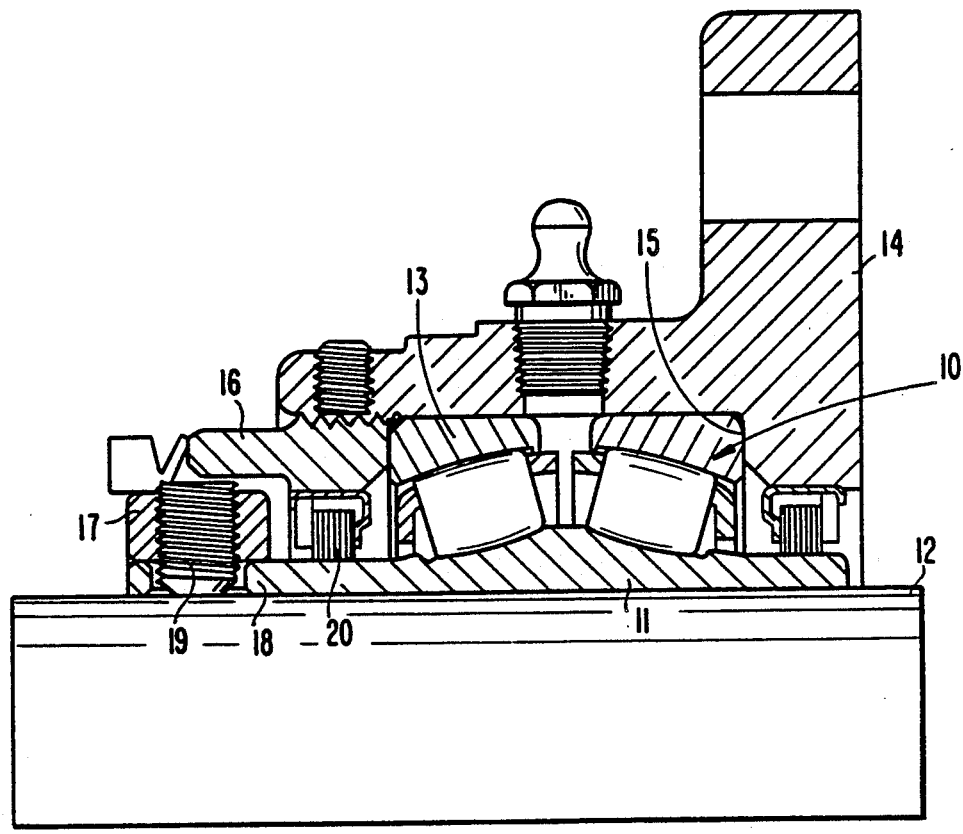
FIG. 1 is a partial cross-sectional view showing a prior art embodiment of a bearing and seal system for a rotating shaft.
Figure 1A:
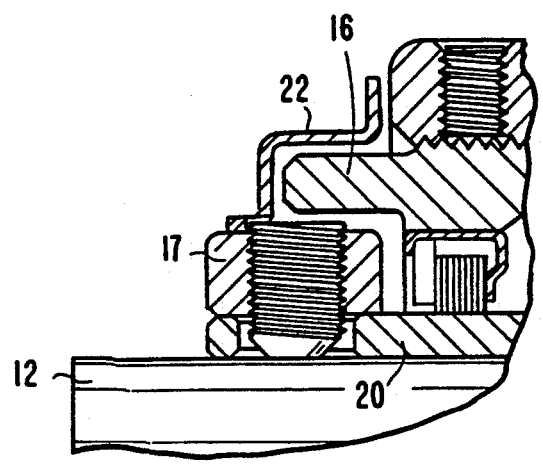
FIG. 1A is a partial cross-sectional view showing an alternate prior art bearing and seal system.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The present invention provides an auxiliary bearing seal which provides superior sealing, particularly in adverse environments. The bearing seal of the present invention finds use, for example, in equipment which generates or is used in conditions of high levels of dirt, dust, etc. The seal is compact and highly efficient, and overcomes problems in the prior art which have resulted in high incidences of bearing failure under these extreme use conditions.

Referring in particular to the drawings, there is shown an inventive bearing seal 23 constructed in accordance with the present invention. The seal 23 is shown mounted to a bearing system 24 for reception of a rotating shaft 25. The seal 23 includes closely-conforming portions, hereafter described, which provide highly effective protection for the underlying bearings and seals.

For purposes of illustration, the bearing system 24 includes a pair of bearings 26 contained within a housing 27 and receiving the rotating shaft 25. Housing 27 includes a cylindrical portion which primarily contains the bearings, and a flange 28 with mounting apertures 29 for securing the housing to an external structure. The bearings comprise an inner race 30 which serves both of the bearings, bearing elements 31, and outer races 32 and 33. It will be appreciated, however, that the bearing system may include any of a variety of well known bearing designs, including single or multiple bearings. It will also be recognized that the type of bearing, i.e. ball bearing, roller bearing, etc., is not critical to the present invention and any of these types is contemplated herein.

The housing 27 includes an annular shoulder 34 against which the outer race 32 is received. On the opposite side of the bearings the cylindrical portion 35 of the housing 27 is internally threaded, and receives an externally threaded cover 36. This cover bears against and retains in position the outer race 33. A set screw 37 is received through the cylindrical portion of the housing, and bears against the cover 36 to prevent it from rotating after it is in position.

Seals are provided on both sides of the bearings. A first lip seal 38 is received within the annular cavity between the inner race 30 and the housing 27. A second lip seal 39 is received within the annular space between the inner race 30 and the cover 36. A lube fitting 40 (shown out of position in FIG. 2) is threadedly mounted to the housing 27 to permit application of lubricant in conventional fashion into the space in which the bearings are positioned.

A collar 41 is received over the inner race 30. A pair of set screws 42 and 43 are received through the collar 41 and bear against the shaft 25. The placement of the set screws at approximately 90° apart is typical, and provides an optimum application of force between the collar and the shaft.

Figure 2:
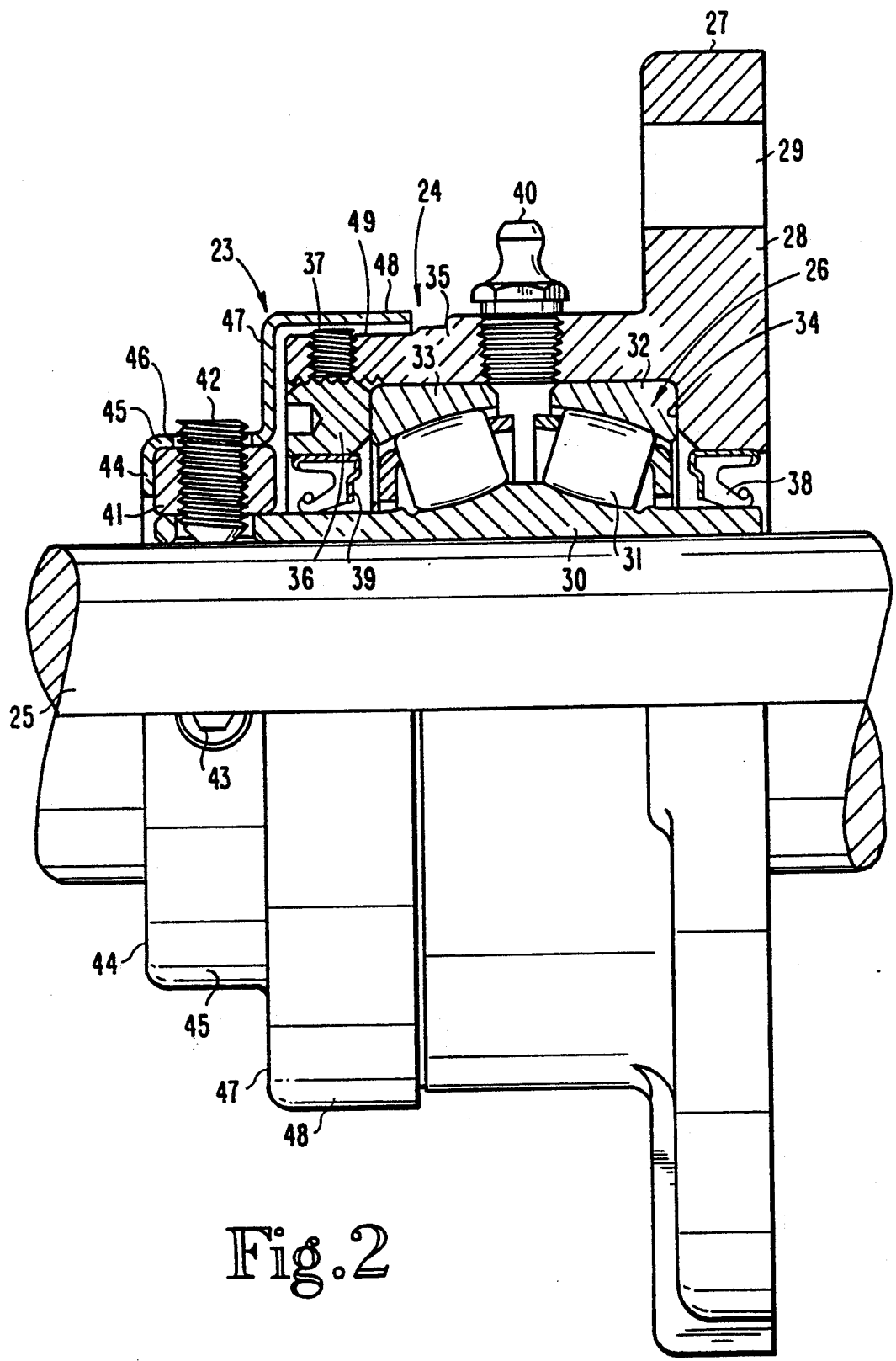
FIG. 2 is a side view, partially in cross section, of an auxiliary bearing seal of the present invention shown as mounted to a bearing system and associated rotating shaft.
Figure 3:
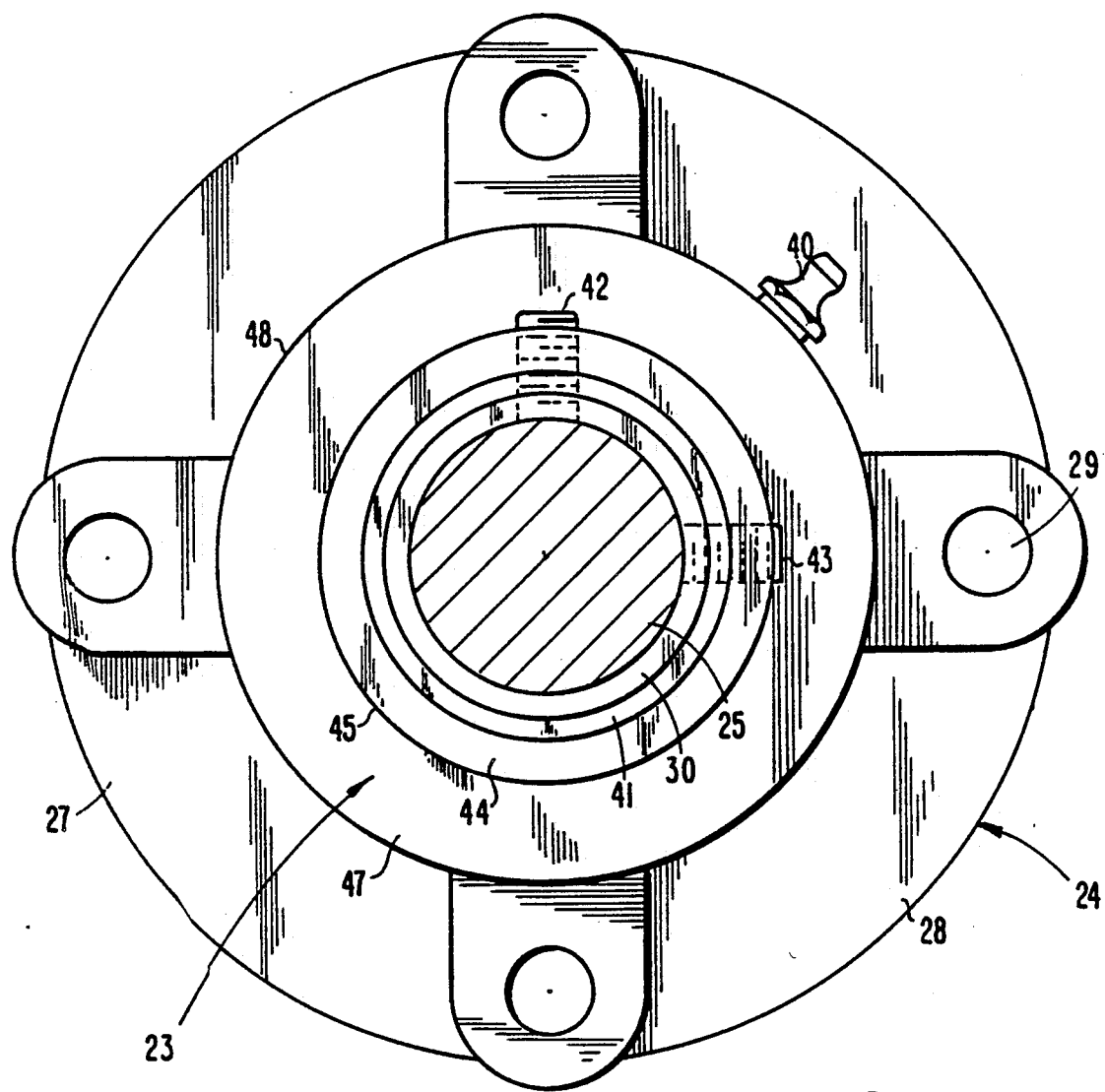
FIG. 3 is a front, elevational view showing the auxiliary bearing seal.

The system of FIGS. 2 and 3 as thus far described is typical of rotating shaft bearings in certain applications. The present invention is directed to providing improved sealing for the bearing system. As previously stated, the systems of the foregoing type have been subject to high maintenance or rapid failure when subjected to extreme use conditions. While various auxiliary sealing systems have been known in the prior art, these have not always been useful since the space limitations may be prohibitive to these alternate designs. The present invention provides a highly effective auxiliary seal for bearing systems of this type, while being extremely compact and readily mounted.

The inventive seal 23 comprises a close fitting flinger shaped in conformity to the collar 41 and the cover 36. Mounting of the flinger is made simple due to its conforming shape, and the provision for securement by means of the set screws, such as 42 and 43, already in use for the bearing system. Thus, the seal 23 requires no modifications to the existing system, and is mounted without any new or different securement means. The auxiliary seal therefore is able to provide added protection against dirt, dust, etc. entering the area of the seal 35, and yet is sufficiently compact and easy to mount as to be received in difficult applications, such as up against a bulkhead.

The seal 23 in contoured to fit closely with the adjacent portions of the bearing system. The seal includes a first annular portion 44 having a surface which fits against the collar 41. A first cylindrical portion 45 has a surface which fits against the outside diameter of the collar 41. This portion 45 is provided with apertures, such as 46, which are positioned for reception of the set screws 42 and 43. It will be appreciated that the seal 23 may therefore be readily mounted to the collar 44 by means of these set screws. It will also be seen that the shape of the seal does not interfere with access to the set screws, and therefore does not adversely affect the attachment of the collar to the shaft.

The seal further includes a second annular portion 47 which conforms closely with the adjacent portions of the housing 27 and cover 36. Since the seal 23 rotates with the shaft 25 by means of its attachment through collar 41, the annular portion 47 is preferably spaced close to, but slightly away from, the adjacent surfaces of the housing and cover. In a similar fashion, seal 23 includes a second cylindrical portion 48 which closely conforms with the adjacent outer surface of the housing 27. In fact, the cylindrical portion 35 of the housing 27 is preferably provided with a machined surface 49. The cylindrical portion 48 of the seal 23 may therefore be formed to very closely conform to this outer surface 49, while being spaced only a very slight distance therefrom.

The seal 23 is therefore seen to provide a flinger which is mounted through the collar to the shaft, and rotates therewith, while being in very close conformity to adjacent portions of the bearing system. By providing the close spacing with both the annular, radially-projecting portion 47 and the cylindrical, axially-projecting portion 48, the seal provides a relatively long and tortuous path for dirt and the like to gain access to the area of seal 35 and the associated bearing components. Consequently, the seal 23 is highly effective in protecting the bearing system, even under extreme conditions of use. In addition, the space between the seal and the bearing housing and collar is filled with grease to further enhance the sealing effect.

The auxiliary seal of the present invention has application in many situations. It will find particular utility in machinery which subjects the bearing assemblies to excessive amounts of dirt and dust. Examples of such machines include stalk choppers, concrete planers and concrete saws.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An auxiliary seal for a bearing system for a rotating shaft, the bearing system including a bearing assembly having an inner race, bearing elements and an outer race received within a housing, the housing including a cylindrical portion extending in a first direction, the inner race having an extended portion projecting in the first direction outwardly of the housing, the bearing assembly further including a collar received over the extended portion of the inner race and at least one set screw received through the collar and attaching the collar to the shaft, the collar having an annular surface facing in the first direction and an outer diameter surface, the auxiliary seal comprising:

a formed flinger mountable to the collar, said flinger including a first annular portion received against at least a portion of the annular surface of the collar, a first cylindrical portion extending from the first annular portion and received against the outer diameter surface of the collar, a second cylindrical portion positioned adjacent and spaced from the cylindrical portion of the housing, and a second annular portion spanning between the first and second cylindrical portions, the first cylindrical portion including at least one aperture sized and positioned for reception therethrough of a set screw securing the collar to the shaft.

2. A bearing and seal assembly for reception of a rotating shaft which comprises:
- a bearing assembly including an inner race, bearing elements and an outer race received within a housing, the housing including a cylindrical portion extending in a first direction, the inner race having an extended portion projecting in the first direction outwardly of the housing;
- a collar received over the extended portion of the inner race;
- means for securing said collar to a rotating shaft, said means including at least one set screw received through said collar for attaching said collar to the shaft, said collar having an annular surface facing in the first direction and an outer diameter surface; and
- a formed flinger mountable to said collar, said flinger including a first annular portion received against at least a portion of the annular surface of said collar, a first cylindrical portion extending from the first annular portion and received against the outer diameter surface of said collar, a second cylindrical portion positioned adjacent and spaced from the cylindrical portion of said housing, and a second annular portion spanning between the first and second cylindrical portions;

the first cylindrical portion of said flinger including at least one aperture sized and positioned for reception therethrough of the set screw of said collar securing means.

3. The assembly of claim 2 and which further includes lubricant received between said flinger and said housing.

4. The assembly of claim 2 in which the cylindrical portion of said housing is machined.

5. The assembly of claim 4 and which further includes lubricant received between the second annular portion of said flinger and the machined surface of said housing.

6. The assembly of claim 2 and which further includes a cover received within said housing, said cover and said housing having substantially aligned, axially facing surfaces, the second annular portion of said flinger being positioned adjacent and spaced from the substantially aligned surfaces of said cover and said housing.

7. The assembly of claim 6 and which further includes lubricant received between said flinger and said housing.

8. The assembly of claim 6 in which the cylindrical portion of said housing is machined.

9. The assembly of claim 8 and which further includes lubricant received between the second annular portion of said flinger and the machined surface of said housing.

* * * * *